UNITED STATES PATENT OFFICE.

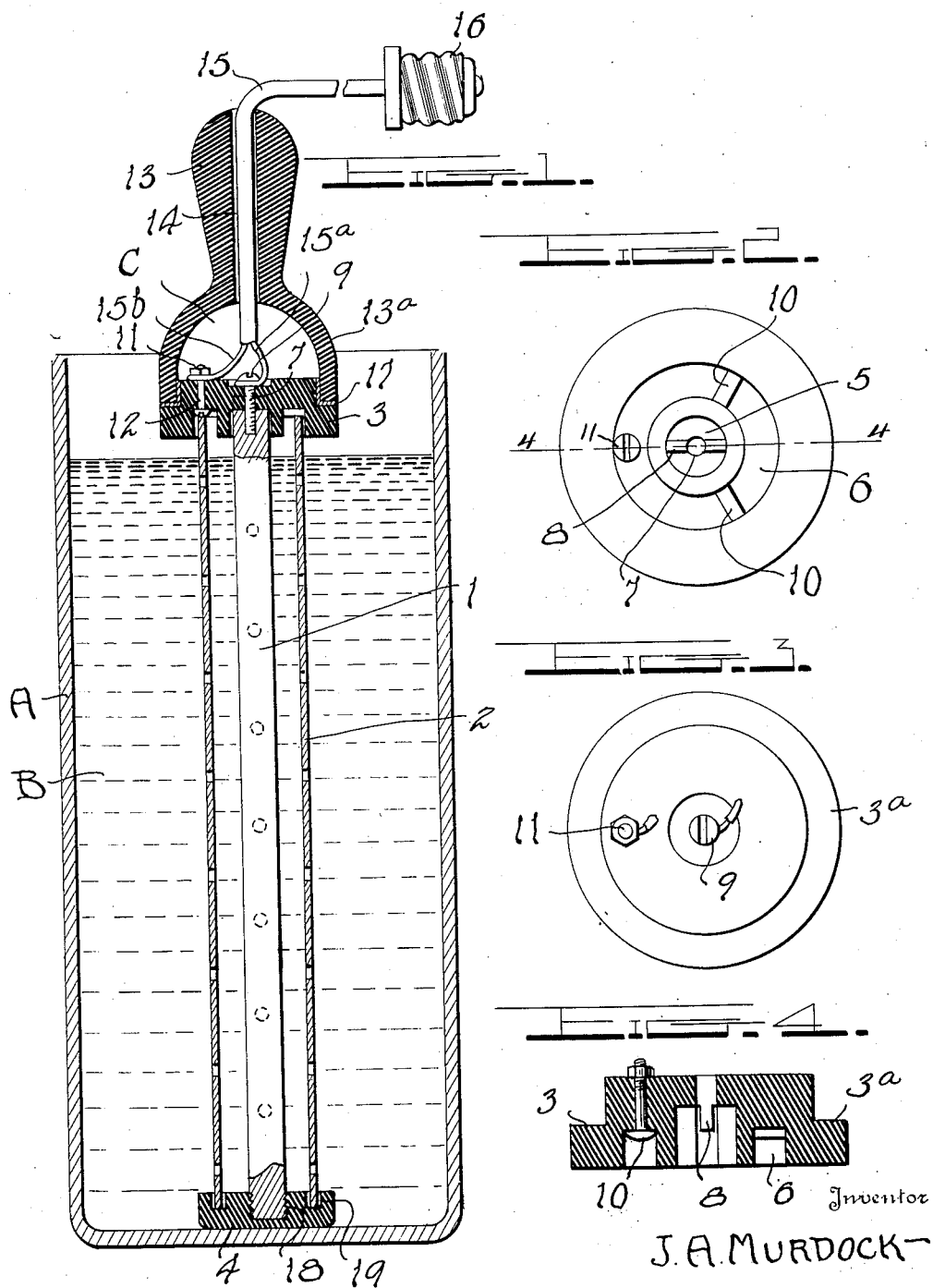

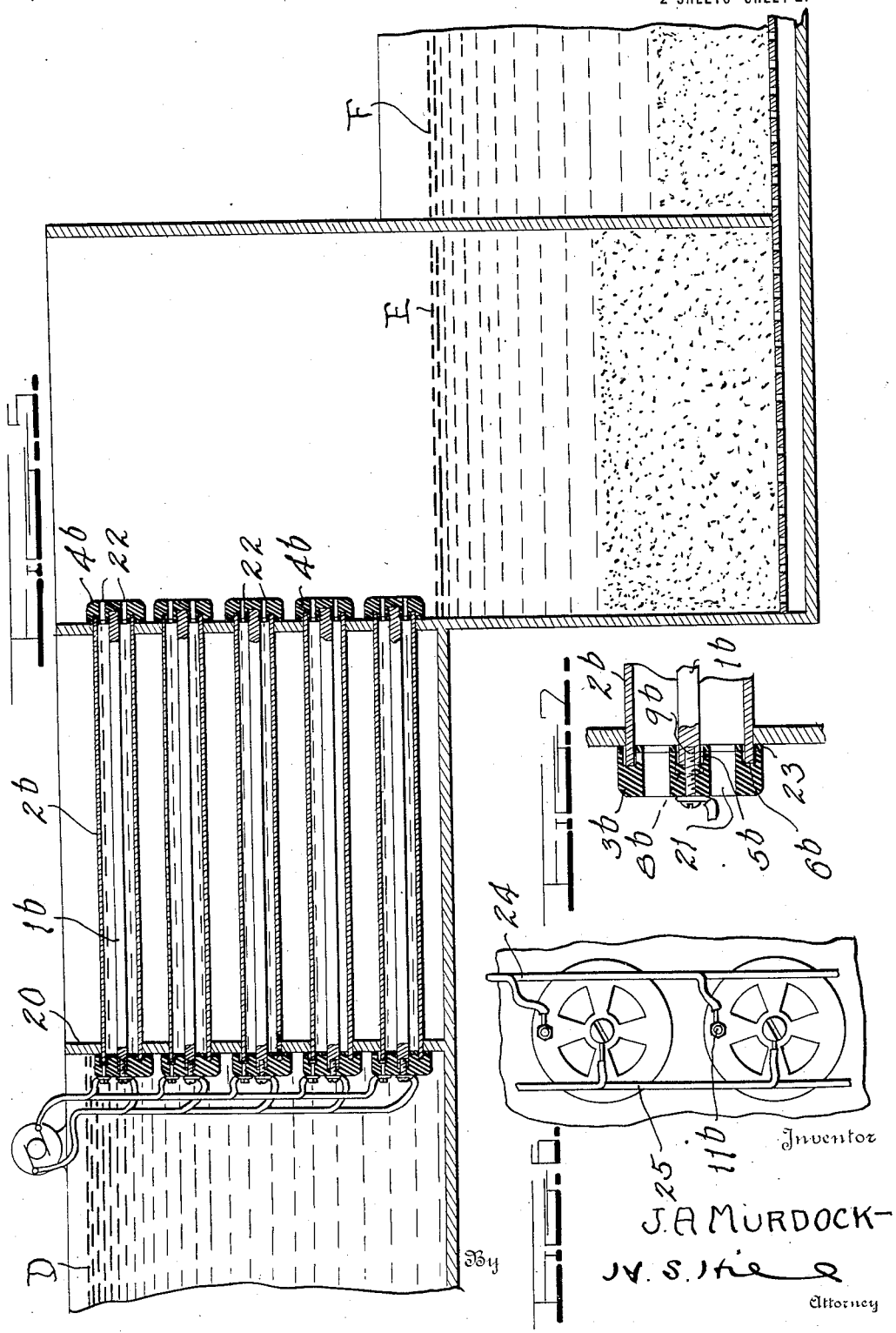

JAMES A. MURDOCK, OF LOS ANGELES, CALIFORNIA, ASSIGNOR OF SEVEN-SIXTEENTHS TO JOHN H. HIRST, OF SEATTLE, WASHINGTON, AND NINE THIRTY-SECONDS TO CECILE A. MURDOCK, OF LOS ANGELES, CALIFORNIA.

WATER-PURIFICATION APPARATUS.

1,159,699.      Specification of Letters Patent.      Patented Nov. 9, 1915.

Application filed June 28, 1915. Serial No. 36,843.

*To all whom it may concern:*

Be it known that I, JAMES A. MURDOCK, a citizen of the United States, residing at Los Angeles, in the county of Los Angeles and State of California, have invented certain new and useful Improvements in Water-Purification Apparatus, of which the following is a specification.

The present invention relates in general to the purification of water and like liquids by means of electrolysis, and has for its object to provide an electrically operated water purification apparatus which embodies novel features of construction whereby all bacteria and foreign matter in suspension or solution can be quickly and effectively removed from the water, and which can be employed for the treatment of water in any desired quantities from one gallon or less to one million gallons or more.

Further objects of the invention are to provide a device of this character which is comparatively simple and inexpensive in its construction, which is practically fool proof and can be handled by an inexperienced operator without danger of injuring himself or causing any damage to property, which can be easily taken apart and thoroughly cleaned at any time, which is inexpensive in operation, and which can be easily made in different sizes and capacities so as to purify water in any desired quantities.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a longitudinal sectional view through a water purification device constructed in accordance with the invention, showing a simple form thereof adapted for domestic use. Fig. 2 is an enlarged bottom plan view of the insulating head. Fig. 3 is a top plan view of the same. Fig. 4 is a transverse sectional view through the insulating head, said view being taken on the line 4—4 of Fig. 2. Fig. 5 is a vertical sectional view through a modified form of the invention, showing an embodiment thereof in which a plurality of units are arranged in a battery so that comparatively large quantities of water can be quickly acted upon. Fig. 6 is a fragmentary front elevation of a portion of the device, showing the heads of two of the units. Fig. 7 is a longitudinal sectional view through the forward end of one of the units.

Corresponding and like parts are referred to in the following description and indicated in all the views of the drawings by the same reference characters.

This invention is an improvement upon the device shown by a copending application, Serial No. 24,703, which was filed April 29, 1915 by James A. Murdock, the present applicant and Cecile A. Murdock, although the basic or underlying idea of the two inventions is the same.

The first four figures of the drawing illustrate a simple embodiment of the invention which includes but a single unit and is more particularly designed for domestic purposes where it is only necessary to act upon comparatively small quantities of water, while the remaining figures of the drawing illustrate an embodiment of the invention in which a number of units are assembled so as to act continuously upon water flowing through the same and thereby enable a large quantity of water to be purified.

Referring more particularly to Figs. 1 to 4 of the drawing, the reference character A designates a suitable container or vessel for the reception of the water B which it may be desired to purify. The apparatus includes a pair of electrodes 1 and 2 which may be formed of any suitable material, such as aluminum, and which are adapted to be submerged in the water to be purified. The electrode 1, which is the positive electrode, is in the form of a rod and passes centrally through the electrode 2 which has a tubular construction being clamped between a porcelain head 3 and a porcelain cap 4. The head 3 is in the form of a disk, being provided in its lower face with a centrally disposed recess 5 adapted to receive the electrode 1, and an annular groove 6 adapted to receive the electrode 2. The central recess 5 communicates with an opening 7 extending through the head 3, and is provided at the base thereof with a transversely disposed rib 8 which enters a corresponding transverse groove in the upper end of the electrode 1 so as to lock the electrode against rotation when it is in position. A screw 9 passes through the central opening 7 of the porcelain head 3 and engages an axially disposed opening in the end of the electrode 1, and when this screw 9 is tightened the electrode 1 is rigidly secured to the porcelain head 3, being locked against rotation with respect thereto by means of the engagement of the transverse rib 8 at the base of the recess 5 with the corresponding transverse slot or groove of the electrode. The base of the annular groove 6 is provided with a pair of radially disposed wings or seats 10 which coöperate with the head of a screw 11 passing through an opening 12 in one side of the head to provide a three point support for the upper end of the tubular electrode 2. The two seats 10 and the screw 11 are preferably equidistant from each other, and the head of the screw projects into the base of the annular groove 6 substantially the same distance as the seats 10 so that when the tubular electrode is clamped in position between the head 3 and the cap 4 it will be firmly seated in position and will have a good electrical contact with the screw 11. The contact screw 11 is permanently mounted upon the head 3 so as to automatically make contact with the tubular electrode 2 when the latter is clamped in position, said contact being also automatically broken when the electrode is unscrewed to clean the device, so that the purifier is absolutely safe in use.

A handle 13 of porcelain or other suitable insulating material is applied to the head 3, said handle being formed with an axial opening 14 through which the conductor cable 15 passes, said cable being adapted to be connected to any suitable source of electric supply, and being shown in the present instance as terminating in the ordinary plug 16. The base of the handle 13 is enlarged at 13$^a$ and made hollow so as to form a chamber C. The mouth of the enlarged base 13$^a$ of the handle 13 receives the head 3 and is closed thereby, being shown in the present instance as in engagement with the rabbeted upper edge 3$^a$ of the head. A suitable cement 17 is preferably provided at the joint between the head and the handle so as to hermetically seal the chamber C. The conductor cable 15 passes through the axial opening of the handle 13, the positive terminal 15$^a$ being engaged by the screw 9 of the central electrode 1, while the negative terminal 15$^b$ is engaged by the screw 11 which contacts with the tubular electrode 2.

The cap 4 is formed of suitable insulating material and is provided with a centrally disposed recess 18 which has a threaded engagement with the end of the central electrode 1. The cap 4 is also formed with an annular groove or seat 19 for the reception of the lower end of the tubular electrode 2. The cap 4 is thus screwed upon and carried by the central electrode 1, while the tubular electrode 2 is clamped in position between the head 3 and the cap. In assembling the parts, the positive electrode 1 is rigidly secured to the porcelain head 3, the tubular electrode being subsequently placed in position and clamped between the cap and the head. When the cap is screwed tightly in position the upper end of the tubular electrode 2 is forced tightly against the contact screw 11 and the wings or seats 10 at the base of the annular groove 6 in the head 3, so that good electrical connection is established between the tubular electrode and the negative terminal 15$^b$. The positive terminal 1 is completely inclosed by the tubular electrode 2 in combination with the porcelain head 3 and porcelain cap 4, so that the device can be handled freely without danger of receiving a shock, even when the current is turned on. The apparatus is thus substantially fool proof and can be safely handled by an inexperienced operator. When it is desired to cleanse the electrodes, this can be readily accomplished by unscrewing the insulating cap 4 and removing both the cap and the tubular electrode 2. There is thus no difficulty encountered in keeping the device in a thoroughly clean and sanitary condition.

In order to purify the water, the current is turned on at the source and the electrode inserted in the water, as shown by Fig. 1. The tubular electrode 2 is formed in the periphery thereof with a suitable number of circulating openings 2$^a$ through which the water can circulate, and the electrolysis will start as soon as the device is placed in the water and the gap between the electrodes bridged by the entrance of the water into the tubular electrodes. Any matter will be deposited in the bottom of the receptacle, all bacteria will be killed, and organic matter, both animal and vegetable, will be transformed into a flocculent precipitate. The precipitates and sediment can be readily removed by decanting or filtration, and the product will be perfectly pure water.

It will be obvious that by using an electrode 1 of a larger or smaller diameter the distance between the electrodes 1 and 2 can be varied, and adjustment thereby made for treating different kinds of water in the most effective manner. As previously explained, the upper end of the central electrode 1 is permanently attached to the porcelain head 3, and the chamber C within the handle 13 hermetically sealed, while the tubular electrode 2 and porcelain cap 4 are removable to admit of the electrodes being easily taken apart and cleaned whenever such may become necessary.

Fig. 5 illustrates a modification in which a plurality of the water purification units are arranged in a battery so that large quantities of water can be quickly acted upon. The various units are similar in construction to the form of the invention previously described, each of them including a central electrode 1$^b$ passing axially through a tubular electrode 2$^b$, although the outer electrode 2$^b$ is imperforate and arranged in a substantially horizontal position so that the water to be purified can flow continuously through the same. The various units may be supported in any suitable manner, and for the purpose of illustration the tubular electrodes 2$^b$ are shown as inserted through corresponding openings in a pair of upright plates 20, the water to be purified flowing continuously through the tubular electrodes from a suitable reservoir D, and passing from the device into a settling tank E which operates to remove the sediment and precipitates. From the settling chamber E the clear water from which all bacteria and impurities have been removed may collect in the tank F. One end of each of the central electrodes 1$^b$ is permanently secured to a porcelain or insulating head 3$^b$, while the tubular electrodes 2$^b$ are removably clamped in position between the insulating heads 3$^b$ and the porcelain or insulating caps 4$^b$. The heads 3$^b$ are similar in construction to the heads 3, although they are formed with a number of circulating openings 21 through which the water from the reservoir D can enter the tubular electrode 2$^b$ and flow through the same. In a similar manner the porcelain caps 4$^b$ are formed with openings 22 through which the water emerges after passing through the tubular electrodes. During its passage through the electrodes the water is subjected to the necessary electrolysis to purify the same, and by regulating the length of the electrodes and the flow of the water through the same the length of treatment can be timed as found necessary to act in the most effective manner upon the particular water being treated. If desired, a suitable packing 23 may be provided to form a tight joint between the heads 3$^b$ and the supporting plates 20 so as to prevent the water from leaking through the joints and circulating around the exterior of the tubular electrodes 2$^b$. Each of the heads 3$^b$ is formed with a central recess 5$^b$ to receive the end of the central electrode 1$^b$ and also with an annular groove 6$^b$ to receive the end of the tubular electrode 2$^b$. As in the previous instance the end of the tubular electrode 2$^b$ bears against the seats 10$^b$ and the head of the screw 11$^b$ so as to provide a three point support, while the end of the electrode 1$^b$ is engaged by a screw 9$^b$ and slotted to receive a transverse rib 8$^b$ at the base of the recess 5$^b$. The screws 11$^b$ are connected to the negative conductor 24, while the screws 9$^b$ are connected to the negative conductor 25. The caps 4$^b$ are removable as in the previous instance so that any particular unit can be removed and the electrodes taken apart for cleaning at any time by merely unscrewing and removing the cap. As the water flows through the tubular electrodes 2$^b$ of the several units, it is acted upon exactly as in the previous instance to remove any matter in suspension and convert all organic matter into a flocculent precipitate, at the same time killing all bacteria, so that after the water has passed through the settling chamber it is perfectly pure and wholesome.

Both forms of the invention are absolutely safe in use and are extremely effective in operation, owing to the fact that the electric current in passing from the positive electrode to the negative electrode radiates in all directions so as to act upon the entire volume of the water contained within the tubular electrodes.

Having thus described the invention, what I claim as new and desire to secure by Letters Patent, is:—

1. An electrical water purifier, including an insulating head, a rod electrode projecting from one side of the head and having one end thereof in an interlocking engagement with the head, a screw extending through the insulating head and engaging the electrode to retain the latter in position, a contact screw extending through the insulating head, an insulating cap removably threaded upon the opposite end of the rod electrode, a tubular electrode surrounding the rod electrode and removably clamped in position between the cap and the head, the tubular electrode being thereby forced into engagement with the contact screw, and a conductor having the terminals thereof secured to the two screws extending through the insulating base.

2. An electrical water purifier, including an insulating head having a rabbeted edge, a rod electrode projecting from the central portion of the insulating base and having one end thereof in an interlocking engagement therewith, a screw extending through the insulating base and engaging the said end of the rod electrode, a contact screw extending through the insulating base at one side of the rod electrode, a tubular handle having a hollow flared end which fits over the rabbeted edge of the insulating base, a conductor extending through the tubular handle and having the terminals thereof secured to the screws extending through the insulating base, an insulating cap removably threaded upon the opposite end of the rod electrode, and a tubular electrode surrounding the rod electrode and removably clamped in position between the cap and the head, the tubular electrode being forced into engagement with the contact screw of the head when in operative position.

3. An electrical water purifier, including an insulating head provided with a recess having a rib extending transversely across the base thereof, a rod electrode having one end thereof fitted within the recess and formed with a groove adapted to coöperate with the before mentioned rib to provide an interlocking connection between the rod electrode and the head, a fastening member extending through the head and engaging the end of the rod electrode to permanently connect the two members, a contact member extending through the head at one side of the fastening member, an insulating cap removably threaded upon the opposite end of the rod electrode, a tubular electrode surrounding the rod electrode and clamped removably in position between the cap and the head, said tubular electrode then engaging the before mentioned contact member passing through the head, and a conductor having the terminals thereof connected to the fastening member and contact member of the head.

4. An electrical water purifier, including an insulating head, a contact member projecting from the head, a pair of ribs projecting from the head and coöperating with the contact member to provide three raised points, a rod electrode projecting from the head and rigidly connected thereto, an insulating cap removably threaded upon the end of the rod electrode, a tubular electrode surrounding the rod electrode and clamped removably in position between the head and the cap, one end of the tubular electrode bearing against the three raised points so as to firmly engage the contact member, and the conductor having one terminal connected to the contact member and the other terminal in connection with the rod electrode.

In testimony whereof I affix my signature.

JAMES A. MURDOCK.